Patented Feb. 12, 1952

2,585,185

UNITED STATES PATENT OFFICE 2,585,185

PROCESS FOR PRODUCTION OF COPPER POWDER HAVING AN AVERAGE PARTICLE SIZE OF TWO MICRONS

Lester D. Supiro, Asbury Park, N. J.

No Drawing. Application July 16, 1947, Serial No. 761,438

3 Claims. (Cl. 75—0.5)

My invention relates generally to a method for producing copper powder and specifically to the non-electrolytic production of ultra-fine copper powder of uniform particle size.

It is among the objects of my invention to produce copper powder rapidly, and of a uniform particle size without resorting to electrolytic or thermal techniques, whereby a much lesser amount of energy is consumed and the cost of the product is vastly reduced.

Another object of my invention is to take advantage of a special property of cuprous oxide, i. e., to react with sulphuric acid and form metallic copper; under controlled conditions, I use an internal oxidation-reduction process whereby finely divided metallic copper precipitates from a highly concentrated sulphuric acid or copper sulphate solution.

Yet another object of my invention is to precipitate metallic copper without the intervention of a metallic reducing agent.

A still further object of my invention is to precipitate metallic copper without the formation of a waste product, but with the formation of a useful by-product, i. e., copper sulphate.

Yet a further object of my invention is to produce copper powder of a high degree of purity, and of uniform fineness in particle size.

When copper is heated and drawn, its surface oxidizes and a scale forms thereon consisting principally of cuprous and cupric oxides. This is the basic material utilized in my process. Of course, other by-products and primary materials containing cuprous and cupric oxides, may be used. When ore tailings are reclaimed by the ammonia process, when copper ores or metallic copper are treated in a converter, or when natural copper ore (cuprite) contains cuprous oxide, they may be utilized in my process.

So that the reaction may be readily controlled and may proceed with rapidity toward completion, the above named basic materials are ground to approximately 150 mesh or smaller. The resultant powder is thoroughly mixed with water, and then sulphuric acid is added to the mixture. The exact concentration of acid is not critical, but a relatively high concentration, such as 93 per cent is necessary.

When the cuprous oxide in the material reacts with a solution of sulphuric acid, an internal oxidation reduction reaction ensues with the production of copper sulphate and a metallic copper precipitate $$Cu_2O + H_2SO_4 \rightarrow Cu + CuSO_4 + H_2O$$

Since the material reacted upon also contains cupric oxide, a parallel reaction takes place:

$$CuO + H_2SO_4 \rightarrow CuSO_4 + H_2O$$

The copper sulphate is soluble under the conditions of the reaction and remains in solution, but the metallic copper precipitates as a finely divided particle of exceptionally uniform size and structure.

When the reaction is complete, the precipitate may be withdrawn by filtration. A washing type filter press may be used. It is essential to carry on the filtration in the absence of oxygen to avoid the oxidation of the precipitate. The precipitate is thus removed from the copper sulphate solution, but it is still wet with some of the solution. To remove the copper sulphate still involved with the moist precipitate, it should be thoroughly washed with water until a pure copper residue is achieved. The copper residue may then be dried in an inert atmosphere, or under a vacuum sufficiently high to prevent oxidation. The drying should take place at a temperature preferably no higher than 130° C.

The copper sulphate may be reclaimed from the solution by evaporation; if desired, the crystalline residue $CuSO_4 \cdot 5H_2O$ may be reduced to the anhydrous state.

The reaction that takes place in this process is as follows:

$$Cu_2O + H_2SO_4 \rightarrow Cu + CuSO_4 + H_2O$$
$$CuO + H_2SO_4 \rightarrow CuSO_4 + H_2O$$

The gram molecular weight of cuprous oxide is 143.2 grams and that of cupric oxide is 79.6 grams. One mole of either oxide requires one mole of sulphuric acid according to these equations. Therefore, in any mixture of these two oxides, the greater the proportion of cupric oxide, the greater is the amount of sulphuric acid which is required to complete the reaction. But the yield of copper powder depends solely upon the amount of cuprous oxide present in the mixture. Thus, the following examples of reactions and quantities involved will be typical of my process:

| Pounds of Mixture | | Pounds Reacting | Pounds Produced | |
|---|---|---|---|---|
| $Cu_2O$ | $CuO$ | $H_2SO_4$ | $Cu$ | $CuSO_4 \cdot 5H_2O$ |
| 2,000 | 0 | 1,370 | 889 | 3,480 |
| 1,800 | 200 | 1,480 | 800 | 3,770 |
| 1,600 | 400 | 1,586 | 711 | 4,040 |
| 1,000 | 1,000 | 1,915 | 444.5 | 4,846 |

In practice, the amount of water added should be carefully regulated so as not to exceed the amount necessary to keep the copper sulphate in solution at the temperature of the reaction, otherwise the cost of evaporation will be high.

A further reason for keeping the concentration of the copper sulphate high is that at lower concentrations, the metallic copper precipitate is coarse, precipitates slowly, is impure, and of heterogeneous size. Correspondingly, before the reaction takes place, the concentration of the sulphuric acid should be maintained high otherwise a similar poor quality metallic precipitate will result. Here again the quantity of water present in the reaction is an important factor. In practice, a mixture of 1760 pounds of cuprous oxide and 240 pounds of cupric oxide are reacted with 1620 pounds of 93 per cent sulphuric acid and 106 gallons of water. 783 pounds of copper powder and 3800 pounds of copper sulphate are produced.

The reaction is exothermic. When the temperature rises beyond 80° C. the precipitate copper will begin to react with the sulphuric acid as follows:

$$Cu + 2H_2SO_4 \rightarrow CuSO_4 + 2H_2O + SO_2$$

Finely divided metallic copper presents a great surface for reaction and spurs its own destruction. In order to prevent this defeat of the object of this process, it is necessary to carry on the reaction in a vessel provided with a cooling jacket. Cooling should be controlled so that the reaction proceeds within the temperature range of 50° C. to 80° C. Below that temperature, the reaction is too slow and coarser, more irregular particles of metallic copper are formed. Within this temperature range, ninety per cent of the particles will average 2 microns in size with approximately 10 per cent in the range of .1 to 3 microns.

The simple reaction of cuprous oxide with sulphuric acid may produce a metallic copper that will not meet prevailing standards of purity and fineness. By carrying on this reaction in the presence of the corresponding reaction involving cupric oxide and sulphuric acid, the desired degree of purity fineness and uniformity is achieved. This may be through the greater concentration of free copper ions in the solution.

The foregoing procedures are set forth merely as illustrative of my invention, for many changes may be made in the ingredients and their proportions, all within the scope of the appended claims, without departing from the spirit of the invention.

I claim:

1. The process for producing copper powder having a uniform, fine particle size comprising reacting finely divided cuprous and cupric oxides with concentrated sulphuric acid, maintaining a high concentration of the sulphuric acid or of the resultant copper sulphate in the reaction, maintaining the temperature of the reaction lower than 80° C.

2. The process for the non-electrolytic production of copper powder having a uniform, fine particle size of the order of two microns or less without the use of external reducing agents, comprising preparing a concentrated sulphuric acid solution, pulverizing cuprous and cupric oxides, reacting the oxides with the acid, maintaining a high concentration of the sulphuric acid or of the resultant copper sulphate in the reaction, maintaining the temperature of the reaction lower than 80° C.

3. The process for producing copper powder having a uniform, fine particle size comprising reacting finely divided cuprous and cupric oxides with concentrated sulphuric acid; maintaining the reaction in the presence of a high concentration of the sulphuric acid or of the resultant copper sulphate, whereby the growth of the particle of copper powder is inhibited; and maintaining the temperature of the reaction below 80° C. whereby growth of the particle of copper powder is inhibited and the particles are not oxidised by the excess sulphuric acid.

LESTER D. SUPIRO.

REFERENCES CITED

The following references are of record in the file of this patent:

UNITED STATES PATENTS

| Number | Name | Date |
| --- | --- | --- |
| 1,257,943 | Howard | Feb. 26, 1918 |
| 2,170,814 | Drapeau, Jr. | Aug. 29, 1939 |

OTHER REFERENCES

"Comprehensive Treatise on Inorganic and Theoretical Chemistry," by Mellor, published by Longmans, Green and Co., 1923, vol. 3, pages 124, 125, and 235. Also 1939 edition, pages 588 and 589.